United States Patent [19]
Ohmori et al.

[11] Patent Number: 6,138,414
[45] Date of Patent: *Oct. 31, 2000

[54] CAR DOOR GLASS RUN

[75] Inventors: Hitoshi Ohmori, Toyoake; Masanori Aritake, Ichinomiya; Atushi Yatuda, Nakashima-gun, all of Japan

[73] Assignee: Toyoda Gosei Co., Ltd., Aichi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/149,104

[22] Filed: Sep. 8, 1998

[30] Foreign Application Priority Data

Sep. 8, 1997 [JP] Japan ................................. 9-261017

[51] Int. Cl.[7] .................................................. E05D 15/16
[52] U.S. Cl. .............................................. 49/441; 49/440
[58] Field of Search ..................................... 49/440, 441

[56] References Cited

U.S. PATENT DOCUMENTS

| | | |
|---|---|---|
| 4,278,487 | 7/1981 | Hormanns . |
| 4,571,886 | 2/1986 | Shiraishi ................................... 49/440 |
| 4,704,820 | 11/1987 | Kisanuki .................................. 49/441 |
| 4,864,774 | 9/1989 | Onishi et al. ............................ 49/440 |
| 5,228,740 | 7/1993 | Saltzman ................................. 49/440 |
| 5,247,764 | 9/1993 | Jeshurun et al. . |
| 5,265,377 | 11/1993 | Iwasa et al. . |
| 5,306,537 | 4/1994 | Gustafson et al. ...................... 49/440 |
| 5,365,698 | 11/1994 | Nozaki .................................... 49/441 |
| 5,628,150 | 5/1997 | Mesnel .................................... 49/440 |
| 5,692,340 | 12/1997 | Jinma et al. ........................... 49/479.1 |

FOREIGN PATENT DOCUMENTS 2127097  12/1972  Germany .

*Primary Examiner*—Daniel P. Stodola
*Assistant Examiner*—Curtis A. Cohen
*Attorney, Agent, or Firm*—Pillsbury Madison & Sutro Intellectual Property Group LLP

[57] ABSTRACT

A door glass run attaches to a door frame of a vehicle for guiding upward and downward movement of a glass window. In the door glass run of this invention, a plurality of grooves formed in the bottom surface of the door glass run extend lengthwise and are spaced widthwise from each other at predetermined intervals. According to one embodiment, the grooves are arranged so as to successively increase in cross-sectional areas thereof from a centermost groove or centermost grooves to outermost grooves. According to another embodiment, the bottom surface of the door glass run includes both a central surface portion that is flat and free of grooves and side surface portions, which are formed on opposite side walls of the flat central surface portion and have grooves formed therein.

15 Claims, 6 Drawing Sheets

CAR DOOR GLASS RUN

BACKGROUND OF THE INVENTION

1. Field of the Invention

The present invention relates to a door glass run to be attached on a door frame of a car door.

2. Description of Related Art

As shown in FIG. 5, a door glass run 3 (hereinafter, simply referred to as a glass run) is attached on a door frame 2 of a door 1 of a car along an inner side of the door frame 2 for guiding up/down movement of a door glass 5 and sealing a gap between a circumferential edge of the closed door glass 5 and the door frame 2. Further, front and rear vertical extension frame portions 2A of the door flame 2 are provided in a door body and the glass run 3 is attached also on each of the vertical extension frame portions 2A.

Generally, the glass run 3 has a configuration as shown in FIG. 6, in which lips 35 and 36 extend, in a direction to face each other, from the opposite ends, at an opening side, of a body portion 30 which is U-shaped in section. In the glass run 3 attached on a vertical frame of a door frame 2 including extension frame portions 2A, the door glass 5 moves up/down as peripheral portions of opposite surfaces of the door glass 5 contact the lips 35 and 36 of the glass run 3, respectively, and an edge surface of the door glass 5 is also in contact with a bottom surface 31 of the glass run 3.

The bottom surface 31 of the glass run 3 is subject to smoothening treatment by spraying urethane resin, silicon resin, or the like so as to improve the slidability of the door glass 5. However, there has been a problem that foreign matters (or foreign materials) such as sand, dust, and the like may come into the body portion 30 of the glass run 3 and may deposit on the bottom surface 31 to thereby gradually lower the slidability of the door glass 5.

SUMMARY OF THE INVENTION

It is therefore an object of the present invention to provide a glass run in which the slidability of door glass against the glass run and the durability of the glass run are increased, and the generation of abnormal sounds due to foreign materials entering the glass run can be prevented from occurring when the door glass is moved up/down.

According to the present invention, a plurality of grooves are formed in a bottom surface of a glass run body portion having a U-shaped section so as to extend longitudinally at predetermined intervals widthwise. In one embodiment of the present invention, the grooves are designed so as to have sectional areas which become successively larger from the centermost groove (or centermost grooves) formed in a widthwise central portion of the bottom surface to the outermost grooves respectively formed on the opposite sides of the bottom surface. In another embodiment of the present invention, grooves may be formed in the bottom surface of a glass run only on the opposite sides of a flat central surface portion of the bottom surface, but not into the flat central surface portion.

When the door glass moves up/down, the end surface of the door glass moves up/down while slightly transversely vibrating with respect to the central line of a bottom surface of a glass run. These vibrations occur because a car body vibrates or because the curvature of a door frame becomes slightly different from that of the door glass relative to the vertical position of the door glass. The present invention advantageously operates by causing the edge surface of the door glass to sweep foreign materials which deposit on a bottom surface of a glass run out to the opposite sides when the door glass vibrates transversely. That is, according to the invention, the foreign materials which have deposited on the central portion of the bottom surface of the glass run are swept into/out of the opposite sides when the door glass moves up/down, and most of the foreign materials falls into the large grooves formed in the opposite portions on the bottom surface and are thereby discharged. The groove formed in the central portion of the bottom surface is small and, hence, even if the groove is filled with the foreign materials, the glass sliding resistance does not become large so that no abnormal sounds are generated. Also according to the invention, foreign materials which have deposited on the bottom surface of the glass run fall into the grooves formed in the opposite portions on the bottom surface and are thereby discharged. Further, although in an embodiment of this invention no groove is formed in the central portion of the bottom surface with which the door glass comes into slide-contact, the quantity of foreign materials which may remain despite this sweeping-out operation is very small and hence the sliding resistance is hardly increased.

DETAILED DESCRIPTION OF THE PREFERRED EMBODIMENTS

Figure 1:
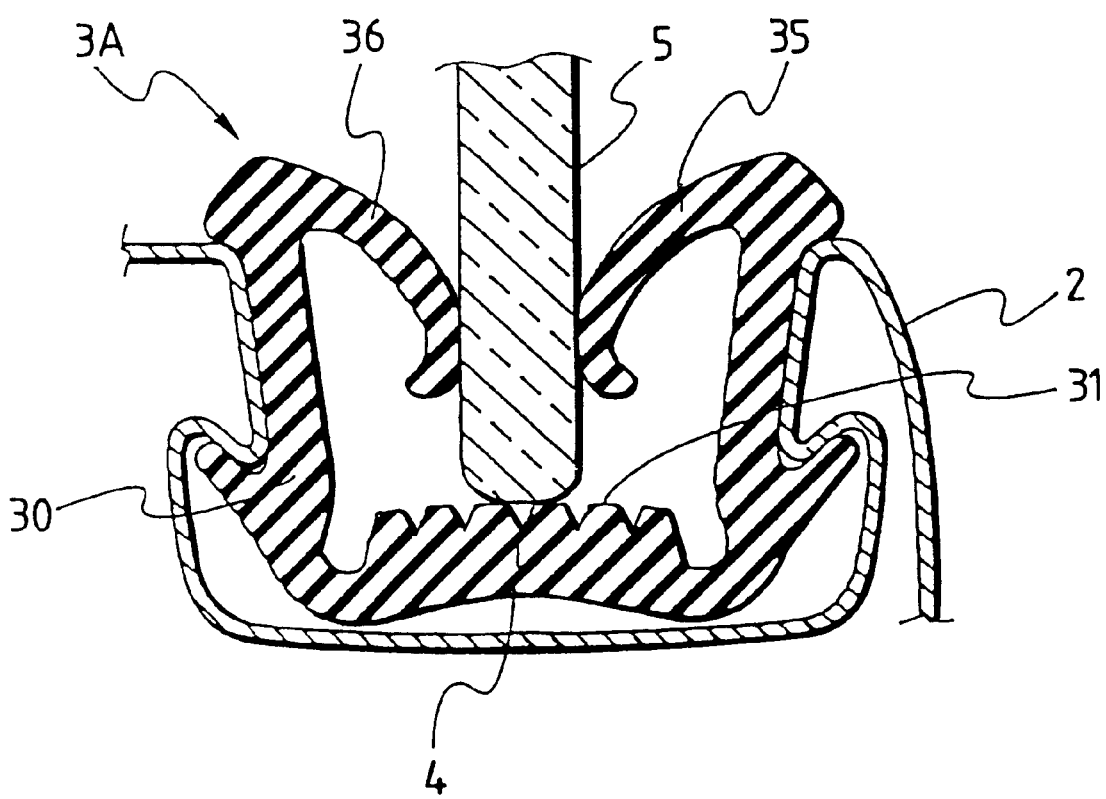
FIG. 1 is a sectional view showing a door glass run according to a first embodiment of the present invention, taken along line I—I in FIG. 5.

FIG. 1 shows a glass run 3A according to a first embodiment of the present invention. This glass run is attached on the vertical frame portion of the door frame 2 of the car shown in FIG. 5.

The glass run 3A is formed of an extrusion molding of rubber, for example, EPDM (ethylene -propylene-diene) rubber, and has a fundamental configuration in which lips 35 and 36 extend from opposite sidewalls, to provide an opening, of a body portion 30 U-shaped in section. A bottom wall (or bottom portion) is designed to be thicker than the remaining portion. Generally, a door glass 5 has a thickness of about 4 mm and an end surface arch-shaped in section. The door glass 5 moves up/down while opposite surfaces of the door glass 5 are in contact with the lips 35 and 36, respectively, and a central portion of a side edge surface of the door glass 5 is in contact with a bottom surface 31 of the glass run 3A.

In the glass run 3A, a plurality of uniform grooves 4 are formed in the bottom surface 31 so as to extend longitudinally at predetermined intervals arranged widthwise to thereby reduce a sliding area between the edge surface of door glass 5 and the bottom surface 31 and to thereby bury foreign materials entering the glass run into the grooves 4. Each of the grooves 4 is shaped in the form of an inverted triangle in section.

In this glass run 3A, by formation of the grooves 4 in the bottom surface 31 of the glass run 3A, the area of slide-contact between the door glass edge surface and the bottom surface 31 of the glass run can be reduced, and foreign materials which have deposited on the bottom surface 31 of the glass run body portion 30 can be discharged into the grooves 4 to thereby reduce the sliding resistance of the door glass 5 against the bottom surface 31 of the glass run.

If the above glass run is used for a long time, there is a possibility that foreign materials will gradually accumulate in the grooves 4 so that the grooves 4 are filled with the foreign materials. The foreign materials accumulated in the grooves 4 come into slide-contact with the edge surface of the door glass 5 to thereby increase the frictional resistance to generate abnormal sounds when door glass 5 is moved up/down.

Figure 2:
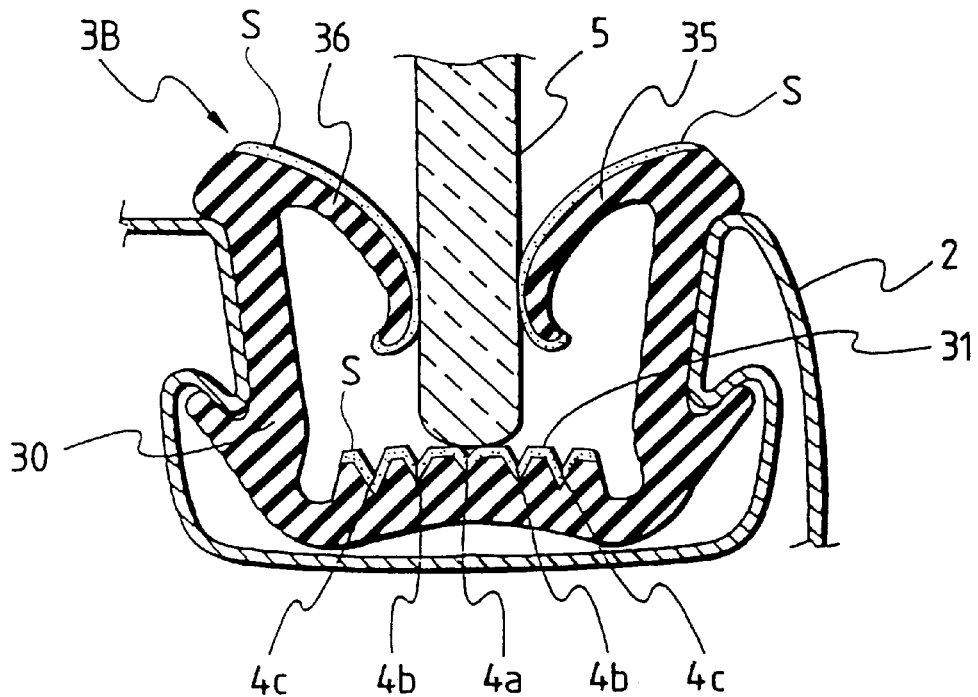
FIG. 2 is a sectional view showing a door glass run according to a second embodiment of the present invention, taken along line I—I in FIG. 5.

FIG. 2 shows a glass run 3B according to a second embodiment of the invention, which is provided for solving the aforementioned problem.

In the glass run 3B shown in FIG. 2, a plurality of mutually-parallel grooves 4a, 4b, and 4c are formed in the bottom surface 31 to extend longitudinally at equal intervals widthwise. Each of the grooves is shaped in the form of an inverted triangle in section and the grooves are designed so as to have sectional areas which become successively larger from the groove formed in a widthwise central portion of the bottom surface 31 to the groove formed on each of the opposite sides of the central portion of the bottom surface 31. In the illustrated embodiment, the centermost groove 4a is formed in the widthwise central position of the bottom surface 31; the outermost grooves 4c are formed in the widthwise opposite-side portions; and the intermediate grooves 4b are formed in the widthwise intermediate portions between the centermost groove 4a and the outermost grooves 4c. The opening width and depth of the centermost groove 4a are selected to be about 0.2–0.3 mm and about 0.2–0.3 mm, respectively. The opening width and depth of each of the outermost grooves 4c are selected to be about 0.7–1.0 mm and about 0.4–0.6 mm, respectively. The opening width and depth of each of the intermediate grooves 4b are selected to be intermediate values between those of the grooves 4a and 4c. The widths of the land portions between the grooves 4a, 4b, and 4c are selected to be an equal value of 0.7–0.8 mm. The bottom surface 31 having the grooves 4a, 4b, and 4c formed therein and the surfaces of the lips 35 and 36 are subject to smoothening treatment S with urethane resin. The sectional shape of each of the grooves is not limited to such an inverted triangle, but it may be shaped into a quadrangle.

In the case of the thus formed glass run 3A, the edge surface of the door glass 5 moves up/down while the edge surface is in slide-contact with the land portions of the bottom surface 31 of the glass run 3A. In this case, the edge surface of the door glass 5 is in slide-contact only with the land portions between the grooves so that an influence of foreign materials attached on the bottom surface 31 is reduced. Even if a large quantity of foreign materials have deposited, the foreign materials on the land portions are swept out right and left by the edge surface of the door glass 5 transversely vibrating when the door glass is moved up/down, so that the foreign materials fall into the grooves 4a, 4b, and 4c. Further, even if the centermost groove 4a is filled with the foreign materials, the contact area of the foreign materials with the edge surface of the door glass 5 is small so that the sliding resistance is not largely increased and no abnormal sounds are generated. Furthermore, when the door glass moves up/down, the maximum width of transverse movement of the central portion of the edge surface of the door glass 5 to contact with the bottom surface 31 of the glass run 3B by a transverse vibration of the door glass 5 is ranged within the distance between the grooves 4a and 4b. Because the intermediate grooves 4b are each larger than the centermost groove 4a, the intermediate grooves 4b are not completely filled with foreign materials before long-term use. Even if the intermediate grooves 4b are filled with foreign materials, the foreign materials hardly produces a large influence on the sliding resistance of the door glass 5. Since the foreign materials swept out by the door glass 5 are received into the grooves 4b and 4c, there is a function to prevent the swept-out foreign materials from depositing on the central portion of the glass run bottom surface 31.

Figure 3:
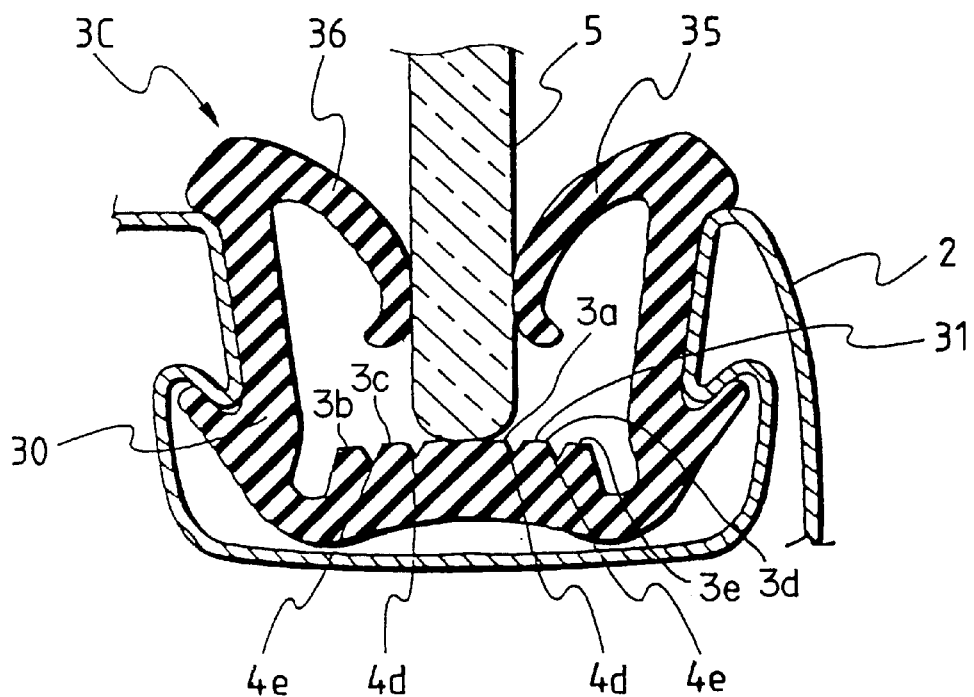
FIG. 3 is a sectional view showing a door glass run according to a third embodiment of the present invention, taken along line I—I in FIG. 5.

FIG. 3 shows a glass run 3C according to a third embodiment of the invention. In the glass run 3C shown in FIG. 3, a central region 31a of a bottom surface 31 is formed into a flat surface with no groove, and longitudinally extending grooves 4d and 4e are formed in outer surface regions at opposite sides of the central region 31a. The flat surface in the central region 31a is designed to have a width which is equal to the width of lateral or left/right vibration of the central portion of the edge surface of the door glass 5 which contacts with the flat surface when the door glass 5 moves up/down. Specifically, the width of the flat central surface region 31a is selected to be about 3–4 mm. The opening width and depth of each of the grooves 4d and 4e on the opposite sides are selected to be 0.7–1.0 mm and about 0.4–0.6 mm, respectively. Lands 31b and 31c located on one side of central region 31a and lands 31d and 31e located on the other side of central region 31a have individual widths less than that of the flat central surface region 31a.

Similarly to the glass run 3B, in the case of the glass run 3C, foreign materials which have deposited on a bottom surface central portion with which the door glass 5 is in slide-contact are discharged into opposite-side grooves 4d and 4e. In the glass run 3C, since no groove is formed in the bottom surface central portion, the glass sliding area is slightly increased correspondingly, in comparison with the glass run 3B. On the other hand, however, there is no groove in the central portion which may be filled with foreign materials. Accordingly, the edge surface of the door glass 5 never comes into slide-contact with the accumulated foreign materials in the central groove. Further, the glass run having the grooves formed in its bottom surface may be integrally molded with thermoplastic olefin elastomer.

Figure 4:
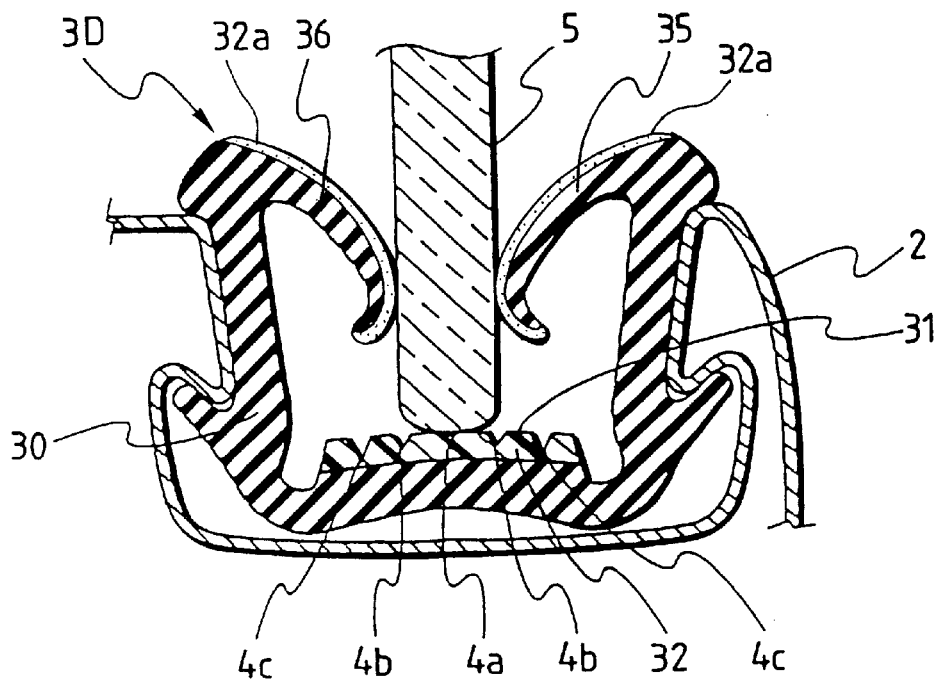
FIG. 4 is a sectional view showing a door glass run according to a fourth embodiment of the present invention, taken along line I—I in FIG. 5.

FIG. 4 shows a glass run 3D according to a fourth embodiment of the invention. In a glass run 3D shown in FIG. 4, a surface layer 32, which is formed of a material different from that of a glass run body and which is superior in smoothness, is formed on the surface of a bottom wall of the body portion 30 so as to face an edge surface of the door glass 5. Grooves for receiving foreign materials are formed in an upper surface 31 of surface layer 32 constituting a bottom wall of the glass run 3D. A surface layer 32a which is formed of a different material in place of carrying-out of smoothening treatment S and which is superior in smoothness may be formed on the surface of each of lips 35 and 36. The surface layer 32, 32a is formed of olefin group resin, for example, polyethylene, polypropylene, etc., or olefin group thermoplastic elastomer, and the surface layer 32 has the same grooves 4a, 4b, and 4c as those in the glass run 3D. Further, the upper surface 31 of the surface layer 32 may be formed in the same manner as that in the case of the glass run 3C. The surface layer 32 is integrally formed with an upper surface of a bottom wall of the glass run 3D by extrusion molding or by sticking of a tape member and fusion bonding thereafter. Incidentally, in the glass run 3D, it is not necessary to subject the surface layer 32 to smoothening treatment by spraying or the like. The glass run body may be formed by using synthetic resin such as PVC (polyvinyl chloride) or the like, or olefin group thermoplastic elastomer, besides the foregoing EPDM rubber.

Figure 5:
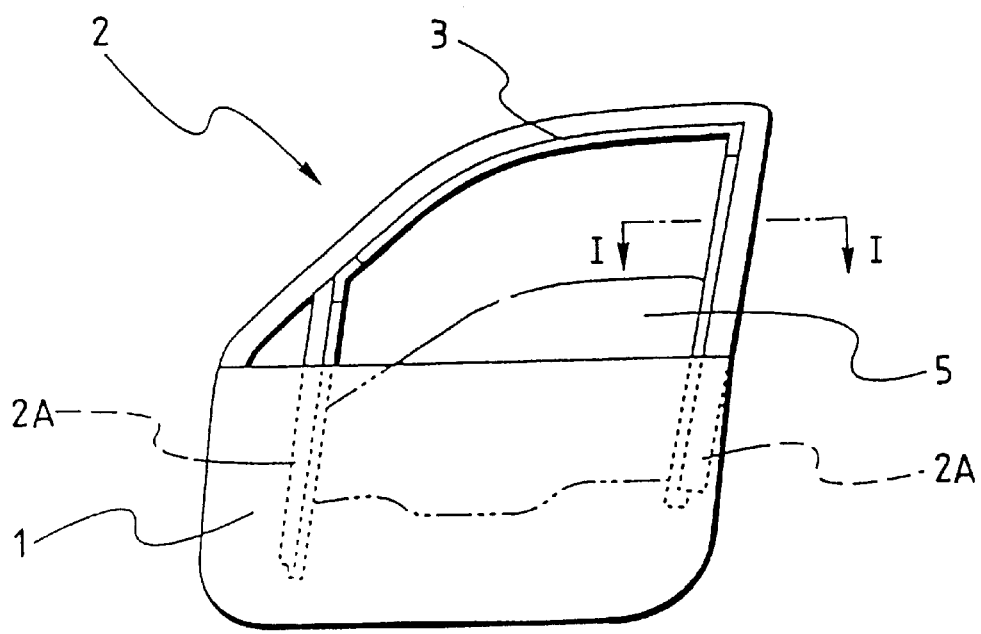
FIG. 5 is a view showing a car door to which the door glass run according to the present invention is applied.
Figure 6:
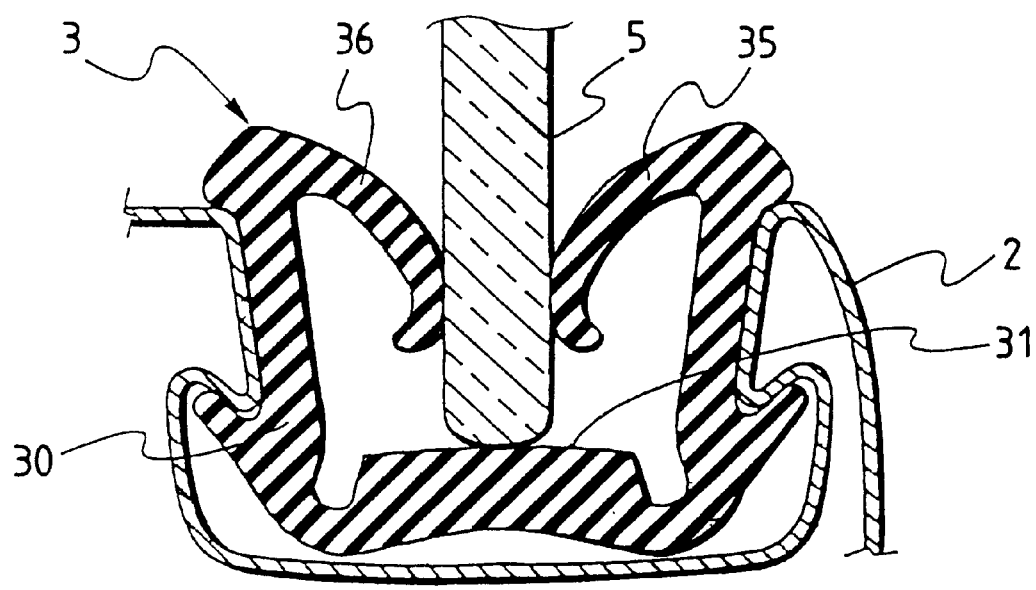
FIG. 6 is a sectional view showing an example of the conventional door glass run, taken along line I—I in FIG. 5.
Figure 7A:
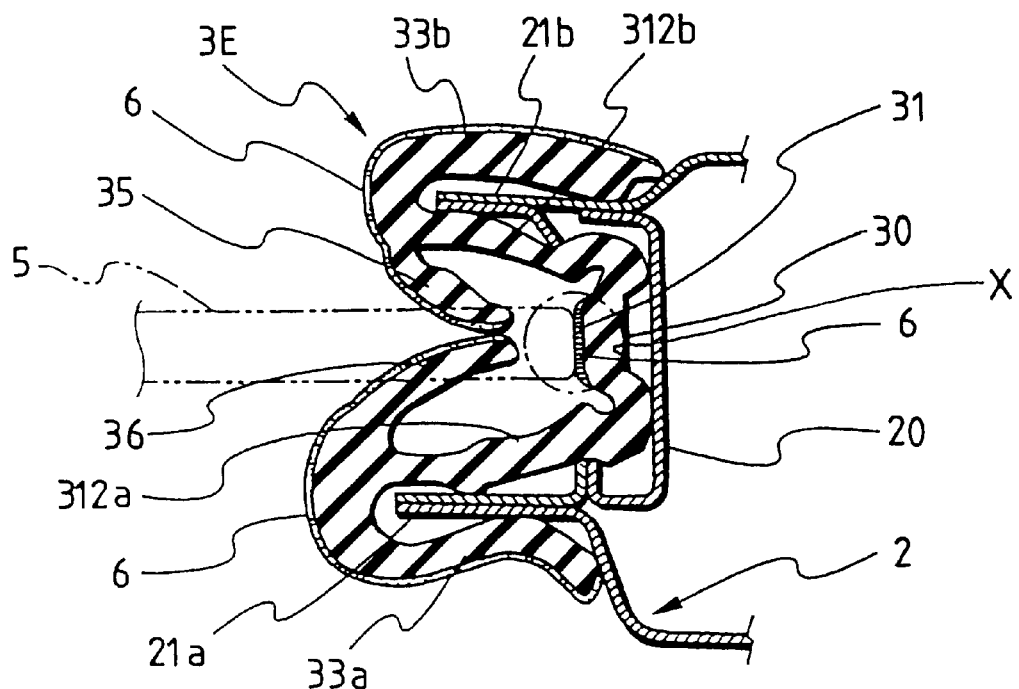
FIG. 7A is a sectional view showing a door glass run according to a fifth embodiment of the present invention and FIG. 7B is an enlarged sectional view of portion X in FIG. 7A.
Figure 7B:
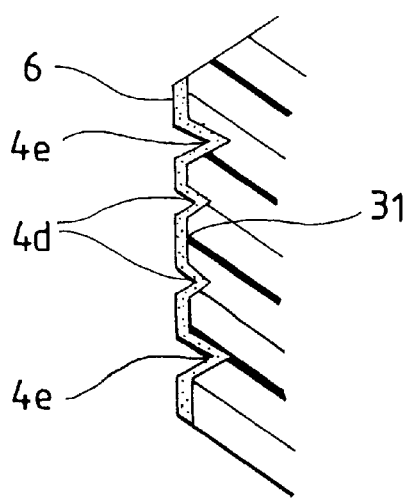

FIGS. 7A and 7B show a glass run 3E according to a fifth embodiment of the present invention, to be attached on the door frame 2 shown in FIG. 5 so that the portion is positioned along the vertical frame portion of the door frame 2. The glass run 3E is obtained by extrusion-molding with TPO (thermoplastic olefin elastomer). The glass run 3E is integrally provided with a body portion 30 substantially U-shaped in section; seal lips 35 and 36 extending from opened front ends of opposite side walls 312a and 312b of the body portion 30 so as to face each other; and mole lips 33a and 33b extending from the opened front ends of the opposite side walls 312a and 312b along the outsides of the opposite walls 312a and 312b reversely to the seal lips 35 and 36. The glass run 3E is attached on the door frame 2 in such a manner that the body portion 30 is fitted onto a channel portion 20 formed in an inner circumference of the door flame 2, and the mole lips 33a and 33b formed inside and outside a car are pressed against inside and outside walls 21a and 21b of the channel portion 20 opposite to the mole lips 33a and 33b respectively.

In the glass run 3E, a coating film 6 of a sliding material is formed on the bottom surface 31 and the whole surface extending from the facing surfaces of the seal lips 35 and 36 to front ends of the mole lips 33a and 33b in the same manner as that in the case of the glass run 3B of the second embodiment illustrated in FIG. 2. The seal lips 35 and 36 is in slide-contact with the door glass 5 when the door glass 5 moves up/down, and the coating film 6 acts also as a coating member of a designed surface. Further, grooves 4d and 4e are formed in the bottom surface 31 so as to be in slide-contact with the edge surface of the door glass 5 and are designed so as to have sectional areas which become successively larger from the centermost grooves 4d formed in the widthwise central portion of the bottom surface 31 to the outermost grooves 4e formed on each of the opposite sides of the central portion in the bottom surface 31. Further, the surfaces of the groves 4d and 4e are covered with the same coating film 6 as described above so that the grooves 4d and 4e are not filled with foreign materials.

As the material of the coating film 6, it is possible to use a mixture material obtained by mixing TPO with polypropylene or polyethylene which is fusible to TPO, or a mixture material obtained in such a manner that TPO and styrene are blended with each other and the thus obtained material is mixed with polypropylene, etc. Polypropylene gives hardness, brightness and a glass slidability to a coating film. Further, as the coating film 6, a polyethylene monomer or a polypropylene monomer may be also used. The coating film 6 may be extrusion-molded at the same time as the glass run 3E is extrusion-molded.

The extrusion-molded coating film 6 is strongly bonded to the body portion 30 of the glass run 3E of TPO and is extremely glossy with improved brightness in comparison with TPO extrusion moldings. When the extrusion-molded glass run of TPO having its whole designed surface appearing as the exterior surface is coated with the coating film 6 is connected at the molded corner portion of TPO, a difference in color tone between the extrusion moldings and the molded corner portion can hardly be perceived and hence the whole glass run has an attractive appearance of being united into one body. Thus, the coating film 6 is extrusion-molded simultaneously with the glass run body portion 30 to thereby improve the smoothness of the glass run 3E against the door glass 5 and improve the exterior appearance at the same time. Further, the coating film 6 is hardly peeled off.

Figure 8A:
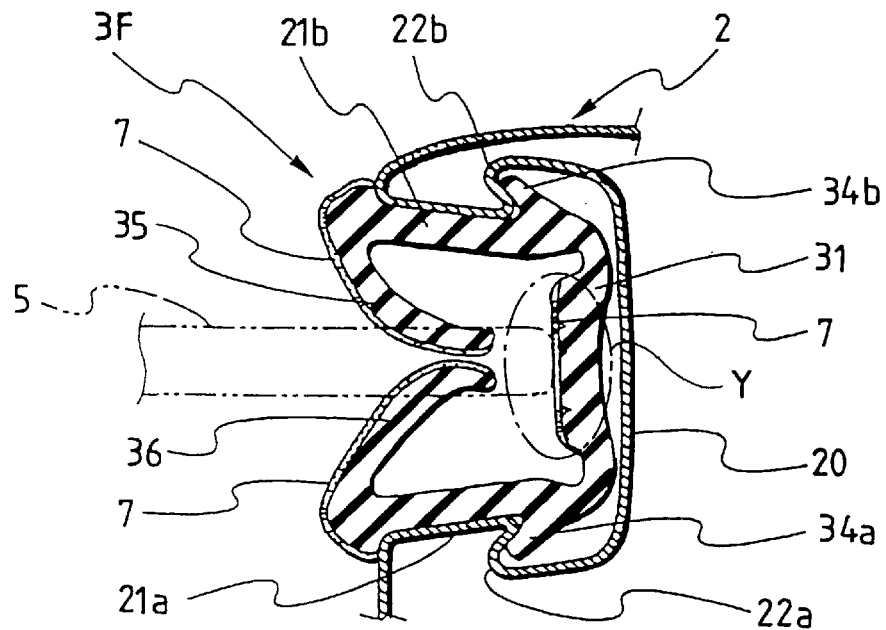
FIG. 8A is a sectional view showing a door glass run according to a sixth embodiment of the present invention and FIG. 8B is an enlarged sectional view of portion Y in FIG. 8A.
Figure 8B:
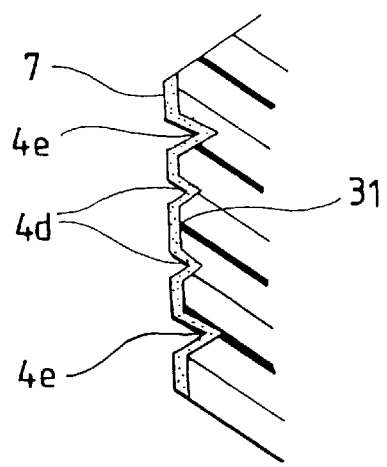

FIGS. 8A and 8B show a glass run 3F according to a sixth embodiment of the present invention. The glass run 3F is different from the glass run 3E in that there are provided no mole lips. Protrusions 34a and 34b are formed in opposite sides of a bottom portion of the glass run 3F to be engaged with stage portions 22a and 22b formed on the opposite side walls 21a and 21b of the channel portion 20 of the door flame 2 so that the glass run 3F is prevented from coming off. The structure of the glass run 3F is substantially the same as that of the glass run 3E and hence parts of the glass run 3F identical to those of the glass run 3D are correspondingly referenced.

In the glass run 3F, a coating film 7 of a sliding material is formed on a bottom surface 31 and the whole designed surface which extends from glass slide-contacting portions of seal lips 35 and 36 to base portions is the same. The coating film 7 acts also as the designed coating member. The method of forming the coating film 7 and the quality of the sliding material are the same as those in the case of the glass run 3E and formation of the coating film 7 gives the same function and effects as those in the case of the glass run 3E.

Similarly to the glass run of EPDM rubber, in the case of the glass run of TPO, the glass run with a body portion 30 having hardness of about 75–80 Hs (JIS-A type hardness) is used. The hardness of the coating film of the sliding material is selected to be about 35–45D (Shore D type hardness) in view of the glass slidability, the damage resistance property, and the contact property with a door glass surface.

According to the present invention, by formation of the grooves in the bottom surface of the glass run, the area of slide-contact between a door glass end surface and the bottom surface of the glass run can be reduced, and foreign materials which have deposited on the bottom surface of the glass run can be discharged into the grooves to thereby reduce the sliding resistance of the door glass against the bottom surface of the glass run. By contriving the size and formation position of the grooves, even if the grooves are filled with foreign materials, the sliding resistance of the door glass is not largely increased by the accumulated foreign materials. Further, the glass runs of FIGS. 7A, 7B, 8A and 8B, the exterior cab be made attractive.

What is claimed is:

1. A door glass run for guiding movement of a door glass along upward and downward directions, said door glass run comprising:

a body portion adapted to attach to a door frame, said body portion having opposite side walls and a bottom portion that collectively provide an opening, said bottom portion having a bottom surface arranged for contacting an edge of the door glass when said body portion is attached on the door frame and operatively associated with the door glass; and lips disposed on said opposite side walls of said body portion so as to extend into said opening for contacting the door glass from opposite surfaces thereof when said body portion is attached on the door frame and operatively associated with the door glass;

wherein said bottom surface of said body portion has a plurality of grooves formed therein, said grooves extending lengthwise along said body portion and being spaced widthwise at predetermined intervals, said grooves being arranged so as to successively increase in cross-sectional areas thereof from a centermost one or centermost ones of said grooves located at a widthwise-central surface portion of said bottom surface to outermost ones of said grooves respectively located on opposite sides of said widthwise-central surface portion in proximity to said opposite side walls of said body portion.

2. The door glass run according to claim 1, wherein each of said grooves has a cross-section shaped as an inverted triangle.

3. The door glass run according to claim 1, wherein said grooves are parallel to one another.

4. The door glass run according to claim 1, wherein said grooves are arranged to successively increase in both opening width and depth thereof from said centermost one or centermost ones of said grooves located at said widthwise-central surface portion to said outermost ones of said grooves.

5. The door glass run according to claim 1, wherein said bottom surface of said body portion comprises a material different from that of the remainder of said body portion, said material being superior in smoothness and being capable of fusion bonding with said body portion, and wherein said grooves are formed on said material.

6. The door glass run according to claim 5, further comprising smooth layers formed on said lips, said smooth layers comprising the same material as that of said bottom surface.

7. The door glass run according to claim 6, wherein said smooth layers cover all outer surface areas of said lips.

8. A door glass run for guiding movement of a door glass along upward and downward directions, said door glass run comprising:

a body portion adapted to attach to a door frame, said body portion having opposite side walls and a bottom portion that collectively provide an opening, said bottom portion having a bottom surface with a flat widthwise-central surface region, said flat widthwise-central surface region extending widthwise for covering an area over which an edge of the door glass faces and laterally vibrates when said body portion is attached on the door frame and operatively associated with the door glass; and lips disposed on said opposite side walls of said body portion so as to extend into said opening for contacting the door glass from opposite surfaces thereof when said body portion is attached on the door frame and operatively associated with the door glass, wherein a plurality of grooves is formed in said bottom surface of said body portion on opposite sides of said flat widthwise central surface region, said grooves extending lengthwise and being spaced widthwise at predetermined widthwise intervals of said bottom surface to define lengthwise extending lands between said grooves, each of the opposite sides of said flat widthwise central surface region containing at least one of said grooves, wherein said flat widthwise-central surface region is free of said grooves, and wherein at least one of said lands has a width less than the width of said flat widthwise-central surface region.

9. The door glass run according to claim 8, wherein each of said grooves has a cross-section shaped as an inverted triangle.

10. The door glass run according to claim 8, wherein said grooves are parallel to one another.

11. The door glass run according to claim 8, wherein said flat widthwise-central surface region is 3 mm to 4 mm in width.

12. The door glass run according to claim 8, wherein said bottom surface of said body portion comprises a material different from that of the remainder of said body portion, said material being superior in smoothness and capable of fusion bonding with said body portion, and wherein said grooves are formed on said material.

13. A door glass run for guiding movement of a door glass along upward and downward directions, said door glass run comprising:

a body portion adapted to attach to a door frame, said body portion having opposite side walls and a bottom portion that collectively provide an opening, said bottom portion having a bottom surface with a flat widthwise-central surface region, said flat widthwise-central surface region extending widthwise for covering an area over which an edge of the door glass faces and laterally vibrates when said body portion is attached on the door frame and operatively associated with the door glass; and lips disposed on said opposite side walls of said body portion so as to extend into said opening for contacting the door glass from opposite surfaces thereof when said body portion is attached on the door frame and operatively associated with the door glass, wherein a plurality of grooves is formed in said bottom surface of said body portion on opposite sides of said flat widthwise central surface region, said grooves extending lengthwise and being spaced widthwise at predetermined widthwise intervals of said bottom surface, each of the opposite sides of said flat widthwise central surface region containing at least one of said grooves wherein said flat widthwise-central surface region is free of said grooves, and wherein said grooves are arranged so as to successively increase in cross-sectional areas thereof centermost ones of said grooves located adjacent said flat widthwise-central surface portion to outermost ones of said grooves located in proximity to said opposite side walls of said body portion.

14. The door glass run according to claim 13, wherein said grooves are arranged to successively increase in both opening width and depth thereof from said centermost ones of said grooves located adjacent said flat widthwise-central surface region to said outermost ones of said grooves located in proximity to said opposite side walls of said body portion.

15. The door glass run according to claim 13, wherein said bottom surface of said body portion comprises a material different from that of the remainder of said body portion, said material being superior in smoothness and capable of fusion bonding with said body portion, and wherein said grooves are formed on said material.

* * * * *